(12) United States Patent
Eilam

(10) Patent No.: US 9,367,336 B1
(45) Date of Patent: *Jun. 14, 2016

(54) PERSONALIZATION OF SHARED RESOURCES

(75) Inventor: Eldad Eilam, San Jose, CA (US)

(73) Assignee: HOPTO INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/490,333

(22) Filed: Jun. 6, 2012

(51) Int. Cl.
G06F 15/173 (2006.01)
G06F 9/445 (2006.01)
H04L 29/08 (2006.01)

(52) U.S. Cl.
CPC ............ *G06F 9/4451* (2013.01); *H04L 67/306* (2013.01)

(58) Field of Classification Search
CPC ............ G06F 11/1469; G06F 11/1471; G06F 11/1402; G06F 11/1458; G06F 17/30348; G06F 17/30551; H04L 63/0272; H04L 63/08; H04L 63/102; H04L 67/08; H04L 67/306; H04L 67/36; H04L 63/0442; H04L 67/14; H04L 67/28; H04L 67/2823; H04L 69/08; H04L 67/10; H04L 63/0218; H04L 63/0428; G06Q 30/08; G06Q 30/0207; G06Q 20/401; G06Q 40/00; G06Q 40/025; G06Q 40/04; G06Q 40/06; G06Q 50/188; G06Q 30/02; G06Q 10/0639; G06Q 10/10; G06Q 30/0251; G06Q 30/0273; G06Q 50/01
See application file for complete search history.

(56) References Cited

U.S. PATENT DOCUMENTS

| | | | | |
|---|---|---|---|---|
| 2001/0029517 A1* | 10/2001 | De Meno et al. | ............ | 709/101 |
| 2009/0193329 A1* | 7/2009 | Oh et al. | ........................ | 715/234 |
| 2010/0131466 A1* | 5/2010 | Chen | ............................. | 707/615 |
| 2010/0262958 A1* | 10/2010 | Clinton et al. | ................ | 717/171 |
| 2011/0153781 A1* | 6/2011 | Srinivas et al. | ............... | 709/219 |

OTHER PUBLICATIONS

U.S. Appl. No. 13/490,331, Eldad Eilam, Personalization of Shared Resources, Jun. 6, 2012.
U.S. Appl. No. 13/490,336, Eldad Eilam, Cloud-Based Personalization of Shared Resources, Jun. 6, 2012.
U.S. Appl. No. 13/490,331; Final Office Action mailed Mar. 5, 2014.
U.S. Appl. No. 13/490,331; Office Action mailed Sep. 12, 2013.
U.S. Appl. No. 13/490,336; Final Office Action mailed Mar. 4, 2014.
U.S. Appl. No. 13/490,336; Office Action mailed Sep. 12, 2013.
U.S. Appl. No. 13/490,331; Office Action mailed Jul. 17, 2014.
U.S. Appl. No. 13/490,336; Office Action mailed Jul. 17, 2014.
U.S. Appl. No. 13/490,331; Final Office Action mailed Apr. 22, 2015.
U.S. Appl. No. 13/490,336; Final Office Action mailed Apr. 24, 2015.

* cited by examiner

*Primary Examiner* — Ruolei Zong
*Assistant Examiner* — Padma Mundur
(74) *Attorney, Agent, or Firm* — Polsinelli LLP

(57) ABSTRACT

Methods and systems for personalization in a shared environment are provided. Information is stored in memory regarding the shared environment to which a plurality of users are provided with access. A plurality of files are also stored in memory. Each file is specific to one of the users and may be updated to include information regarding changes to a resource as made in a session associated with the user. Subsequent access by the user to the resource may be based at least in part on the updated file. For example, in some embodiments, a request may be received over a communication network; the request may concern a rollback for an identified user. A session associated with the identified user may then be restored based on a file associated with the identified user and including information regarding changes to the session associated with the identified user.

20 Claims, 2 Drawing Sheets

PERSONALIZATION OF SHARED RESOURCES

BACKGROUND

1. Field of the Invention

The present invention generally relates to shared resources. More specifically, the present invention relates to personalization of shared computing resources.

2. Description of the Related Art

Currently, there are multiple ways for providing computing resources to a group of users. One such implementation involves virtual desktop infrastructure (VDI) in which an individual virtual desktop environment (e.g., individual sets of resources) is maintained for each user. The advantages of such a system include ease of deploying applications, ease of provisioning, security/privacy, and the ability to rollback for each user to a pre-existing condition (e.g., prior to corruption or damage). For example, an administrator may simply create duplicate environments for new users or restore a corrupted user device by reference to information stored for that particular user.

One disadvantage to such a system, however, is that heavy resource usage (and concurrent expenses) may be incurred. For example, because an entire virtual desktop environment is stored for each user, large amounts of memory may be required. This is especially the case where an enterprise may be very large, require heavy usage of computing resources by its users, and/or need to provide such computing resources to numerous users.

One alternative to the system described above may include use of a terminal services model, in which a set of shared resources (e.g., operating system) may be shared by a plurality of users. Each user may access such a shared environment via individual sessions. Because the operating system is shared, however, changes made by one user (e.g., installing applications) may affect other users, which may be disadvantageous in certain circumstances. Likewise, addressing corruption or damage may require restoration of the underlying computing environment to a status prior to corruption or damage, which also affects multiple users. In addition, a terminal services model lacks many of the advantages of a virtual desktop infrastructure model, described above (e.g., ability to rollback). Because a single computing environment is shared, however, such a system may be less expensive, as well as less heavy on resource usage, than the virtual desktop infrastructure model.

There is, therefore, a need in the art for improved systems and methods for personalization of shared resources.

SUMMARY OF THE CLAIMED INVENTION

Embodiments of the present invention include methods and systems for personalization of shared resources. Information is stored in memory regarding the shared resources to which a plurality of users are provided with access. A plurality of files are also stored in memory. Each file is specific to one of the users and may be updated to include information regarding changes to a resource as made in a session associated with the user. Subsequent access by the user to the resource may be based at least in part on the updated file. A request is received over a communication network; the request may concern a rollback for an identified user. A session associated with the identified user may then be restored based on a file associated with the identified user and including information regarding changes to the session associated with the identified user.

Various embodiments of the present invention include methods for personalization of shared resources. Such methods may include storing information in memory regarding shared resources to which multiple users may access via individual sessions. Methods may additionally include storing a plurality of files in memory. Each file may be specific to one of the users and may be updated to include information regarding changes to a resource as made in a session associated with the user. Methods may further include receiving a subsequent request over a communication network concerning access to the resource, which is then based on the updated file. One example may be a rollback for an identified user, which may involve executing instructions stored in memory to restore a session associated with the identified user based on the file associated with the identified user and including information regarding changes to the session associated with the identified user.

Embodiments of the present invention may further include systems for personalization of shared resources. Such systems may include a server and multiple user devices used to open individual user sessions to access the shared resources. The server may store information regarding the shared resources, as well as files for each user associated with the user devices. Each file may be updated to include information regarding changes made to the session associated with the user. A subsequent request by the user to access the resource may allow the user to access the resource as modified by the change indicated in the user-specific file. One embodiment allows for the server to additionally receive a request regarding a rollback for an identified user and in response, restore a session associated with the identified user based on the file associated with the identified user.

Other embodiments of the present invention include non-transitory computer-readable storage media on which is embodied instructions executable to perform a method for personalization of shared resources as previously set forth above.

DETAILED DESCRIPTION

Personalization of shared resources may be provided. Information is stored in memory regarding the shared resources to which a plurality of users are provided with access via individual sessions. A plurality of files are also stored in memory. Each file is associated with one of the users and may be updated to include information regarding changes to a resource as made in a session by a particular user. Subsequent access by that user may be governed by information regarding changes indicated by the user-specific file. For example, a request may be received over a communication network concerning a rollback for an identified user. A session associated with the identified user may then be restored based on a file associated with the identified user and including information regarding changes to the session associated with the identified user.

Figure 1:
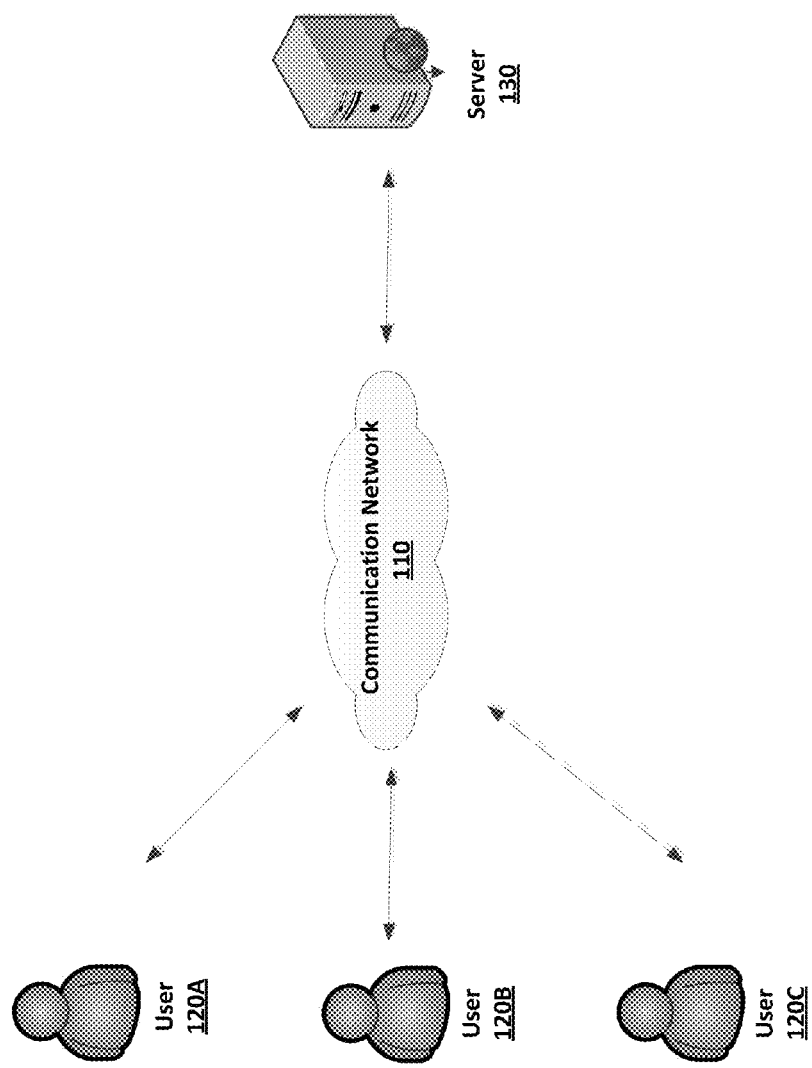
FIG. 1 illustrates a network environment in which an exemplary system for personalization of shared resources may be implemented.

FIG. 1 illustrates a network environment 100 in which a system for personalization of shared resources may be implemented. Network environment 100 may include a communication network 110, one or more user devices 120A-C, and a server 130. Devices in network environment 100 may communicate with each other via communications network 110.

Communication network 110 may be a local, proprietary network (e.g., an intranet) and/or may be a part of a larger wide-area network (e.g., the cloud). The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic user devices 120A-C, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network 110. User devices 120 may also be configured to access data from other storage media, such as memory cards or disk drives as may be appropriate in the case of downloaded services. User device 120 may include standard hardware computing components such as network and media interfaces, non-transitory computer-readable storage (memory), and processors for executing instructions that may be stored in memory.

Each user device 120 may act as a host device interacting with a client device; likewise, each user device 120 may act as the client device in communication with a host. A user device 120 may further include a client application, a client 3D library, and a client display driver. Collectively, these elements may enable the user device and the user to consume computer graphics resources or services provided by server 110.

Server 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may associated with the same user and located in the same local network as user device 120C. Alternatively, server 130 may be located remotely (e.g., in the cloud) and may be associated with a third party that provides services in accordance with embodiments of the present invention. In some instances, the services may be provided via software (e.g., software as a service) downloaded from server 130 to one or more user devices 120. Updated software may similarly be downloaded as the updates become available or as needed.

Server application may represent an application executing ("running") on server 130. The functionality of server application may be visible to and accessible by client 120 via application publishing over the cloud (e.g., communication network 110), such as that supported by GraphOn™ GO-Global™, Microsoft Remote Desktop Services, and Citrix™ XenApp™. Examples of server application 132 may include a computer-aided design (CAD) application, such as AutoCAD® (by Autodesk, Inc. of San Rafael, Calif.) or Cadence™ Virtuoso (by Cadence Design Systems of San Jose, Calif.), a medical clinical workflow application such as Symbia.net™ (by Siemens AG of Munich, Germany), an interactive mapping application such as Google™ Earth (by Google, Inc of Mountain View, Calif.), or a 3D game.

Figure 2:
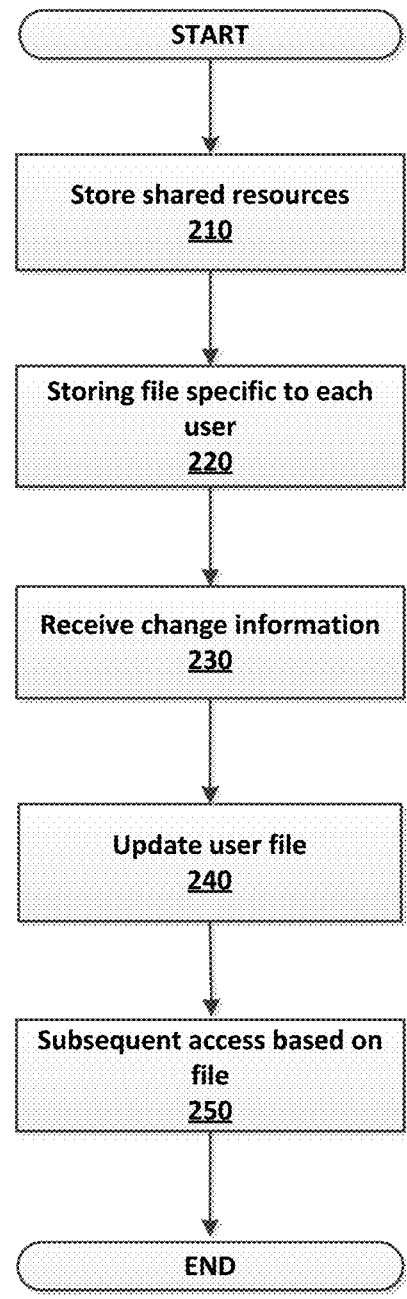
FIG. 2 is a flowchart illustrating an exemplary method for personalization of shared resources.

FIG. 2 illustrates a method 200 for personalization of shared resources. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, information regarding a set of resources shared by multiple users may be stored, a file regarding changes in a session may be stored for each user, information regarding a change by a user may be received, the user-specific file may be updated, and subsequent access to the resource by the user may be based at least in part by the information in the user-specific file. An example of such access may include a rollback request regarding a particular user is received, the user may be identified, and the session associated with the identified user may be restored based on the file stored for the identified user.

In step 210, information regarding a set of shared resources is stored in memory. Such resources (e.g., operating system) may be multiplexed and allows for use by multiple users, who may each access the shared resources through individual sessions. As such, the resources may be shared, and the stored information regarding the same may be accessed and manipulated by each of the multiple users.

In step 220, a file is stored for each user. Such a file maintains information that is specific to the user. User-specific information may concern user preferences, user settings, and various customization options known in the art. A user-specific file may additionally include information regarding any changes made by a user to a resource. Within a session, a user may be allowed to add, delete, or otherwise change a file associated with one or more resources. For example, installing an application in an operating system may involve addition of information associated with the application, as well as deletion or alteration of information that conflicts with the application. As such, all the information regarding current status of a particular user session may be discerned from the stored information regarding the underlying shared resources and the stored file regarding the changes (e.g., made by the user) made within the individual session. In some instances, a set of multiple files may be stored for a particular user. Each file in the set may represent a snapshot of the status of the particular user session at different points in time (e.g., changes made up to yesterday, the day before, the week before, the year before).

In step 230, information is received regarding a change made to a resource by a user, and in step 240, the user-specific file is updated to include the change. The information may be received and stored to a user-specific file in real-time or periodically at predefined intervals. There may be default intervals, or an administrator may set the intervals based on the needs of a particular enterprise.

In step 250, subsequent access to the resource by the user may be based at least in part on the updated file. As noted above, current status of a particular user session may be discerned from the stored information regarding the underlying shared resources and the stored file regarding the changes. The user-specific file allows for individualized sessions and manipulation of the same, all the while reaping the benefits of sharing resources.

As a specific example, a subsequent access request may indicate that a rollback is desired. Such a request may be made where a user device may experience corruption or damage. As such, the user device may need restoration. Alternatively, a new user device may need to be provided. Rather than just providing the underlying computing resources on the restored or new user device, it may be preferable to rollback to a status prior to corruption or damage. As such, the user may be provided with the same level of services that he or she was receiving before the user device was corrupted or damaged. In addition, the user (or administrator) may not be required to go through an extensive process of installing various applications, designating various preferences, etc. in order to achieve the same. As such, the user session may be restored in response to the request. The rollback request may identify a particular user whose session requires restoration. Where there is a set of files stored for a user, the rollback request may further specify which file (e.g., timeframe) to use for restoration. In some embodiments, a prompt may request that a particular file (or timeframe) be specified for use in the restoration. The restoration may be based on the stored information regarding the shared environment, as well as the stored file regarding specific changes associated with the session of the identified user.

Various embodiments of the present invention allow for server 130 to reside elsewhere in the network (e.g., in the cloud). Such may be the case where the shared environment may be cloud-based, which may be the case for various software-as-a-service (SAAS) or platform-as-a-service (PAAS) implementations.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for personalization of shared resources, the method comprising:
    storing information in memory regarding a set of shared resources, wherein the set of shared resources collectively defines an operating system, and wherein a plurality of users are provided with access to the set of shared resources via respective individualized sessions;
    storing a plurality of user files in memory, wherein each user file is specific to a respective user of the plurality of users, and wherein the user files specify a current status of a user individualized session based on the set of shared resources used and changes made by the user during the individualized session;
    receiving information regarding a change to one of the shared resources, wherein the received change is made in the respective individualized session associated with a requesting user from the plurality of users, and wherein the received change made to one of the shared resources relates to installation of a new application;
    updating the user file specific to the requesting user to include information regarding the installed application, wherein subsequent access to the shared resources by the requesting user is based at least in part by the updated user file associated with the user;
    receiving a request over a communication network, the request concerning a rollback for the user to a requested previous session status;
    determining that the requested previous session status is associated with the updated user file; and
    restoring the session of the requesting user to the requested previous session status based on the stored information regarding the set of shared resources and the updated user file specific to the requesting user that includes the information regarding the installed application.

2. The method of claim 1, wherein the requested previous status is associated with a timeframe.

3. The method of claim 1, wherein the timeframe associated with the requested previous session status is subsequent to the change.

4. The method of claim 1, further comprising storing a plurality of files for each user, wherein each file represents a snapshot of status of a respective individualized session for the user at a different timeframe.

5. The method of claim 1, wherein the updating of the file occurs in real-time.

6. The method of claim 1, wherein the updating of the file occurs periodically at predefined intervals.

7. The method of claim 6, wherein the predefined intervals are set by an administrator.

8. The method of claim 1, wherein the restoring of the session occurs on a new device associated with the requesting user.

9. An apparatus for personalization of shared resources, the apparatus comprising:
   memory for:
   storing information in memory regarding a set of shared resources, wherein the set of shared resources collectively defines an operating system, and wherein a plurality of users are provided with access to the set of shared resources via respective individualized sessions, and
   storing a plurality of user files in memory, wherein each user file is specific to a respective user of the plurality of users, and wherein the user files specify a current status of a user individualized session based on the set of shared resources used and changes made by the user during the individualized session;
   a communication interface for receiving information regarding a change to one of the shared resources, wherein the received change is made in the respective individualized session associated with a requesting user from the plurality of users, and wherein the received change made to one of the shared resources relates to installation of a new application;
   wherein memory is updated regarding the user file specific to the requesting user, wherein the updated file includes information regarding the installed application, and wherein subsequent access to the shared resources by the requesting user is based at least in part by the updated user file associated with the user;
   wherein the communication interface receives a request over a communication network, the request concerning a rollback for the user to a requested previous session status;
   determining that the requested previous session status is associated with the updated user file; and
   a processor for executing instructions stored in memory, wherein execution of the instructions by the processor restores the session of the requesting user to the requested previous session status based on the stored information regarding the set of shared resources and the updated user file specific to the requesting user that includes the information regarding the installed application.

10. The apparatus of claim 9, wherein the requested previous status is associated with a timeframe.

11. The apparatus of claim 9, wherein the timeframe associated with the requested previous session status is subsequent to the change.

12. The apparatus of claim 9, wherein the memory further stores a plurality of files for each user, wherein each file represents a snapshot of status of a respective individualized session for the user at a different timeframe.

13. The apparatus of claim 9, wherein the memory updates regarding the file occurs in real-time.

14. The apparatus of claim 9, wherein the memory updates regarding the file occurs periodically at predefined intervals.

15. The apparatus of claim 14, wherein the predefined intervals are set by an administrator.

16. The apparatus of claim 9, wherein the restoring of the session occurs on a new device associated with the requesting user.

17. A non-transitory computer-readable storage medium, having embodied thereon a program executable by a processor to perform a method for personalization of shared resources, the method comprising:
   storing information regarding a set of shared resources, wherein the set of shared resources collectively defines an operating system, and wherein a plurality of users are provided with access to the set of shared resources via respective individualized sessions;
   storing a plurality of user files, wherein each user file is specific to a respective user of the plurality of users, and wherein the user files specify a current status of a user individualized session based on the set of shared resources used and changes made by the user during the individualized session;
   receiving information regarding a change to one of the shared resources, wherein the received change is made in the respective individualized session associated with a requesting user from the plurality of users, and wherein the received change made to one of the shared resources relates to installation of a new application;
   updating the user file specific to the requesting user, wherein the updated file includes information regarding the installed application, and wherein subsequent access to the shared resources by the requesting user is based at least in part by the updated user file associated with the user,
   receiving a request over a communication network, the request concerning a rollback for the requesting user to a requested previous session status;
   determining that the requested previous session status is associated with the updated user file; and
   restoring the session of the requesting user to the requested previous session status based on the stored information regarding the set of shared resources and the updated user file specific to the requesting user that includes the information regarding the installed application.

18. The method of claim 1, wherein each of the plurality of user-specific files tracks changes made by the associated user to one or more of the set of shared resources.

19. The method of claim 1, wherein restoration for a different user is based on a file specific to the different user.

20. The method of claim 1, wherein installing the new application comprises adding information associated with the application and alteration of information that conflicts with the application, and wherein the updated file includes the added information and the altered information.

* * * * *